(12) United States Patent
Roberts et al.

(10) Patent No.: US 11,565,435 B2
(45) Date of Patent: Jan. 31, 2023

(54) MODULAR CUTTER BLADE ASSEMBLY AND MACHINES CONTAINING THE SAME

(71) Applicant: Craftstech, Inc., Elk Grove Village, IL (US)

(72) Inventors: Jeffrey C. Roberts, Elgin, IL (US); Thomas Kuhl, Naperville, IL (US); Rakesh N. Patel, Elk Grove Village, IL (US)

(73) Assignee: CRAFTSTECH, INC., Elk Grove Village, IL (US)

( * ) Notice: Subject to any disclaimer, the term of this patent is extended or adjusted under 35 U.S.C. 154(b) by 59 days.

(21) Appl. No.: 16/344,264

(22) PCT Filed: Jan. 14, 2019

(86) PCT No.: PCT/US2019/013485
§ 371 (c)(1),
(2) Date: Apr. 23, 2019

(87) PCT Pub. No.: WO2019/140383
PCT Pub. Date: Jul. 18, 2019

(65) Prior Publication Data
US 2020/0238552 A1 Jul. 30, 2020

Related U.S. Application Data

(60) Provisional application No. 62/617,259, filed on Jan. 14, 2018.

(51) Int. Cl.
*B26D 7/26* (2006.01)
*B26D 1/00* (2006.01)

(52) U.S. Cl.
CPC ............ *B26D 1/0006* (2013.01); *B26D 7/26* (2013.01); *B26D 7/2614* (2013.01); *B26D 2001/002* (2013.01)

(58) Field of Classification Search
CPC ............... B23B 27/16; B23B 2251/02; B23B 2205/12; B23B 1/00; B23B 2251/00;
(Continued)

(56) References Cited

U.S. PATENT DOCUMENTS 331,934 A * 12/1885 Aiken .................. B23D 35/002
30/349
856,719 A * 6/1907 Nagle .................. B23D 35/002
83/694
(Continued)

FOREIGN PATENT DOCUMENTS

AT 514370 A1 12/2014
CN 102233592 A 11/2011
(Continued)

OTHER PUBLICATIONS

Notification of Transmittal of International Search Report, International Search Report and Written Opinion For PCT/US2019/013485 dated Mar. 15, 2019.

*Primary Examiner* — Kenneth E Peterson

(57) ABSTRACT

The modular cutter assembly for cutting composite material and for use in a composite placement machine wherein the cutter assembly includes a base and a cutting member. The cutting member being removably attachable to the base by a mechanical connection.

12 Claims, 5 Drawing Sheets

(58) Field of Classification Search
CPC .............. B26D 7/26; B26D 2001/002; B23C 5/2204; B23C 5/2458; B23C 5/2472; B23C 5/22
USPC .................................................. 83/840–844
See application file for complete search history.

(56) References Cited

U.S. PATENT DOCUMENTS

| | | | | |
|---|---|---|---|---|
| 1,432,580 A * | 10/1922 | Vauclain | ................ | B23C 5/006 407/31 |
| 1,594,696 A * | 8/1926 | Rose | .................... | B23D 29/026 83/633 |
| 1,740,739 A * | 12/1929 | Kipp | ...................... | A01B 35/26 172/772 |
| 2,779,992 A * | 2/1957 | Hayes | .................... | B23B 27/16 407/107 |
| 3,134,286 A * | 5/1964 | Judd | .................... | B23D 35/002 83/699.41 |
| 3,685,177 A * | 8/1972 | Hahn | .................... | E02F 9/2816 37/446 |
| 4,054,075 A * | 10/1977 | Dvorak | .................... | B26D 5/12 83/633 |
| 4,219,291 A * | 8/1980 | Hoeh | .................... | B02C 18/182 407/31 |
| 4,398,853 A * | 8/1983 | Erickson | ............. | B23B 27/1622 407/104 |
| 4,763,906 A * | 8/1988 | Barbieux | .......... | B23B 31/16279 279/123 |
| 4,887,772 A | 12/1989 | Robinson et al. | | |
| 5,485,873 A | 1/1996 | Crammond | | |
| 6,418,826 B1 | 7/2002 | Auzuki | | |
| 6,848,203 B2 * | 2/2005 | Hohmann | ............. | E02F 9/2883 37/457 |
| 6,960,049 B2 * | 11/2005 | Inayama | ................. | B23B 27/08 407/103 |
| 7,682,109 B2 * | 3/2010 | Hecht | ................. | B23B 27/1622 407/102 |
| 8,801,345 B2 * | 8/2014 | Yoshino | .................... | B23C 1/12 409/131 |
| 8,870,499 B2 * | 10/2014 | Harif | ...................... | B23B 51/02 407/102 |
| 10,030,367 B2 * | 7/2018 | Dare | ...................... | E02F 9/2883 |
| 10,307,833 B2 * | 6/2019 | Harif | .................. | B23B 27/1681 |
| 2007/0071559 A1 * | 3/2007 | Koskinen | ............... | B23B 27/16 407/34 |
| 2010/0111621 A1 | 5/2010 | Harif | | |
| 2011/0119964 A1 * | 5/2011 | Karlsson | ............... | E02F 9/2833 37/444 |
| 2014/0199128 A1 | 7/2014 | Hecht | | |
| 2015/0078843 A1 * | 3/2015 | Diego | ...................... | B23C 5/22 407/103 |
| 2016/0288215 A1 | 10/2016 | Harif | | |
| 2019/0085531 A1 * | 3/2019 | Johnson | ............... | B23D 35/002 |

FOREIGN PATENT DOCUMENTS

| | | | | |
|---|---|---|---|---|
| EP | 0958900 A2 | | 11/1999 | |
| GB | 2577077 A | * | 3/2020 | ............ B23B 29/12 |
| JP | 06126698 A | | 5/1994 | |
| JP | 3074431 U | | 1/2001 | |
| JP | 3101353 U | | 6/2004 | |
| WO | WO 2001/015876 A1 | | 3/2001 | |
| WO | 2005092545 A1 | | 10/2005 | |

\* cited by examiner

MODULAR CUTTER BLADE ASSEMBLY AND MACHINES CONTAINING THE SAME

The present application is the U.S. National Stage Application of PCT Application No. PCT/US2019/013485, filed Jan. 14, 2019, which claims the benefit of and priority to U.S. Provisional Patent Application Ser. No. 62/617,259, filed Jan. 14, 2018, the disclosure of which is hereby incorporated herein by reference.

FIELD OF THE DEVICE

The present disclosure relates to high performance cutting blade assemblies and machines having such blades for cutting composite material, and more specifically, modular cutting blade assemblies for use in composite placement machines in which the composite material is cut while it is moving relative to the blade assembly.

BACKGROUND

Cutting composite material is uniquely difficult when compared to cutting traditional building materials, such as wood, metal or other traditional building materials. Composite materials are made by combining two or more materials that often have different properties. Automated Fiber Placement (AFP) involves the use of composite materials that are often lighter than metals but have greater strength than metal.

Several difficulties are associated with cutting composite materials. For example, reinforcement fibers contained in the composite material, such as carbon fiber, fiberglass, Kevlar® or a fiber-reinforced matrix system, are abrasive and can quickly wear down a cutting tool. Delamination is another difficulty that may be encountered with the cutting of composite materials, and ideally, it is desired to achieve a clean cut of the composite materials so as to reduce the risk of delamination. Delamination of the composite material may occur if the blade of the tool is damaged, dull or chipped, or the blade contacts the composite material at the wrong angle. Also, some composite materials have a particular or specific orientation wherein a specific angle of cutting is desired.

Traditionally high performance cutting blades have been of unitary construct wherein the cutting tool is either a single one-piece design or a two-piece design in which the two pieces are permanently affixed together by, for example, brazing. For instance, a steel mounting body and harder carbon or diamond compound cutting insert are brazed together to permanently bond the two materials together. One of the reasons that the industry uses such unitary constructs is to reduce or eliminate failures in the cutting blade. As mentioned above, composite materials are very strong and oftentimes stronger than metal. As a result of the strength of the composite materials, the cutting blades are placed under extreme pressure during the cutting of these materials. It was believed that a blade of unitary construct was required in order for the blade to maintain its integrity, without failures or fractures, while enduring this extreme pressure. Furthermore, it was believed that blades of unitary construct are easier to control so as to make cuts at precise angles and orientations.

Although unitary cutting blades perform well at cutting composite materials, there are some drawbacks to their use. For example, if a blade chips or becomes dull, the machine is stopped and the whole blade is required to be replaced. Oftentimes, the blades are attached to a lever or actuator at a location of the machine that is difficult to access and/or because of the secure attachment of the cutting blade to the lever or actuator, it may take a long time to undo the attachment to remove the blade. When such blades are being replaced, the machine may be down for a considerable amount of time, which in turn slows down production. Also, when a blade is replaced, the whole blade is replaced, which may be a waste of material when some portions of the blade may have little or no wear and may still be useable.

Therefore, there remains a need for improved cutting blades for cutting composite materials and for use in AFP machines.

DESCRIPTION OF THE PREFERRED EMBODIMENT

Figure 1:
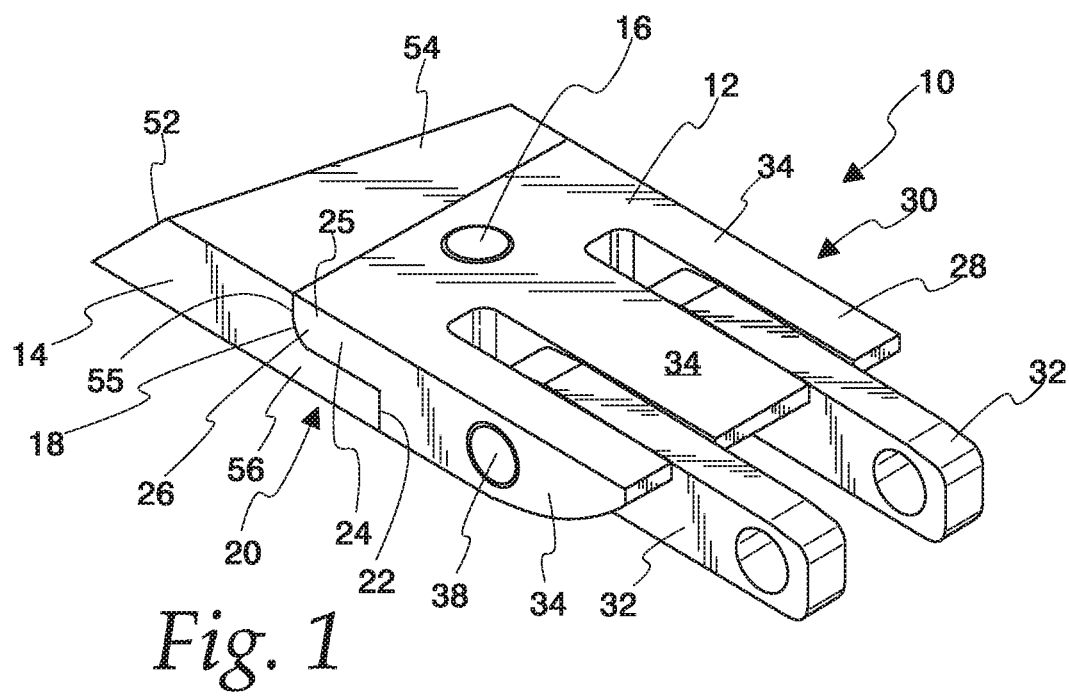
FIG. 1 is a perspective view of the modular cutter assembly in accordance with the present disclosure.
Figure 2:
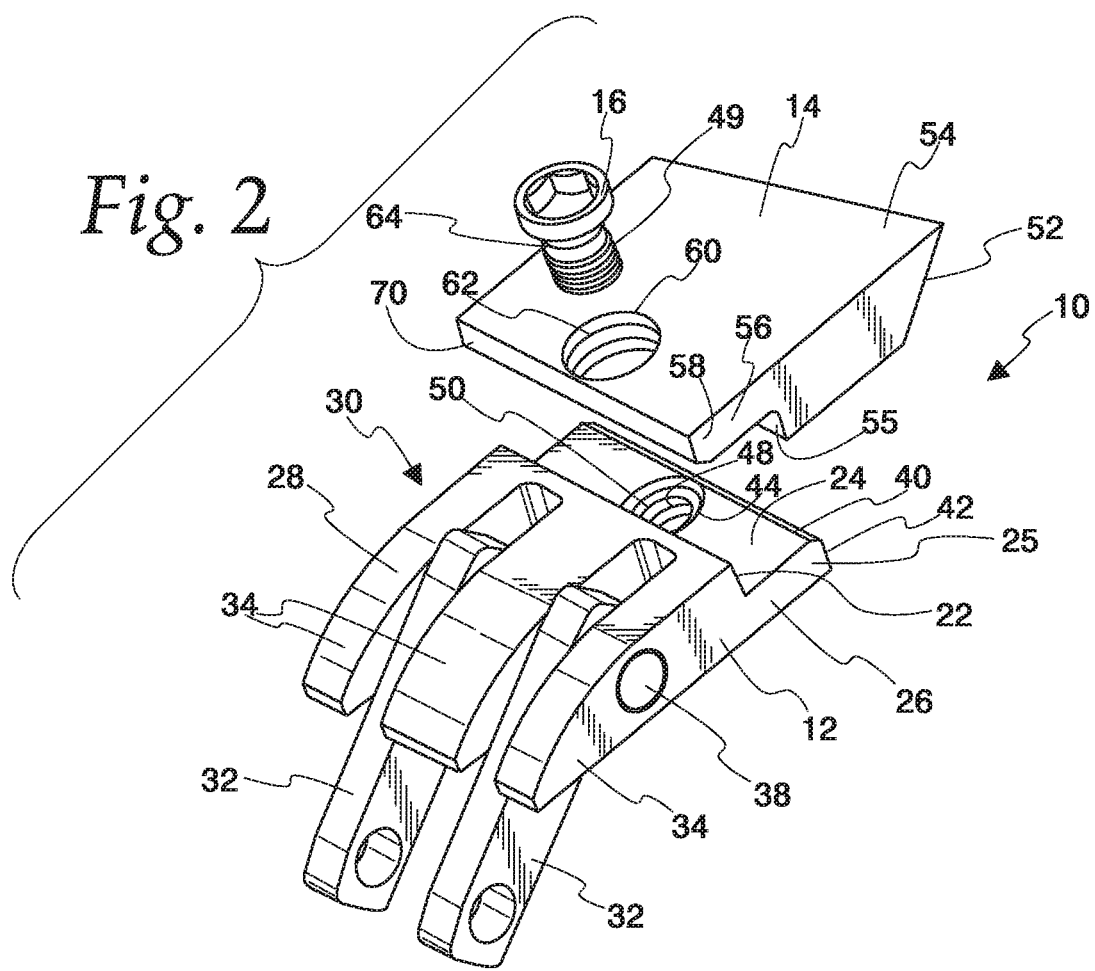
FIG. 2 is an exploded view of the modular cutter assembly of FIG. 1.

Turning now to the figures, FIG. 1 is a perspective view of one embodiment of a modular cutter assembly 10 of the present disclosure, and FIG. 2 is an exploded perspective view thereof. The cutter assembly 10 may be used to cut composite material. For example, cutter assembly 10 may be used in a composite placement machine or AFP machine to cut composite material that is being laid onto an application surface. The base 12 may be formed from a ductile material such as steel, and the cutting member 14 may be formed from a harder material than the base 12. The cutting member 14 may be formed from carbon or diamond compound material such as poly-crystalline diamond (PCD), or may be formed from other materials which are coated with PCD or other hard coatings. Other materials may be used for the base 12 and the cutting member 14.

The base 12 and cutting member 14 are two separate components that are mechanically attached to each other to form the modular cutter assembly 10. The cutting member 14 is removably attached to the base 12, such that the cutting member 14 may be relatively quickly removed and replaced with a different cutting member, as needed or desired. In the illustrate embodiment, the base 12 and cutting member 14 are mechanically attached to each other and held in place by a set screw 16. The set screw 16 may be any suitable set screw, including but not limited to, those made from steel or carbide. The mechanical engagement between the base 12 and cutting member 14 shown in FIGS. 1, 5 and 6 includes a lap joint 18. However any other suitable joint may be employed, including but not limited to a labyrinth or V-notch joint.

Figure 3:
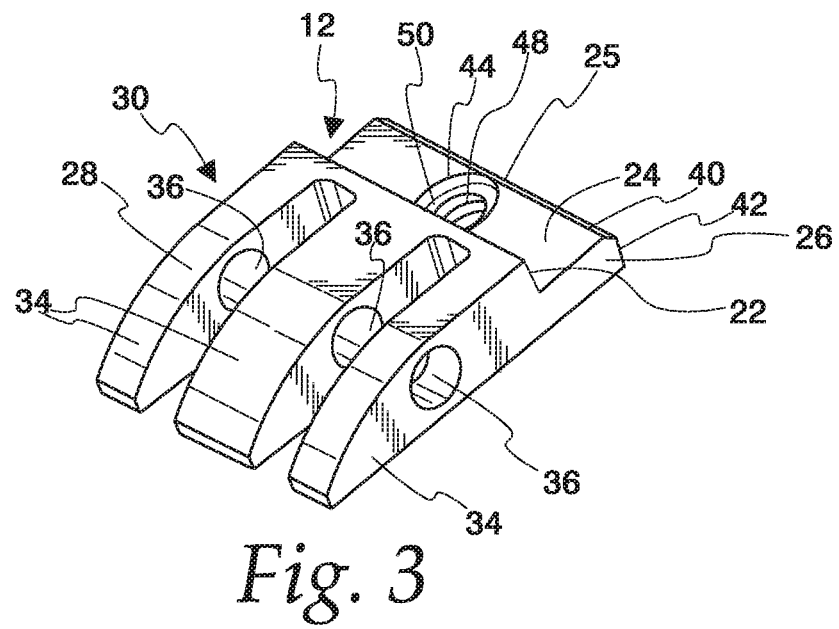
FIG. 3 is a perspective view of the base of the modular cutter assembly shown in FIG. 1.

Referring to FIGS. 1-3, the base 12 includes a front end 26 and a rear end 28. An attachment mechanism 30 for attaching the base 12 to a lever(s) or actuator(s) 32 of a composite material cutting machine (e.g., AFP or composite placement machine) (not shown) is located at the rear end 28 of the base 12. In the illustrated embodiment, the attachment mechanism 30 includes a plurality of spaced apart arms 34 at the rear end 28 of the base 12. Each arm 34 includes a bore 36 therethrough, as shown in FIG. 3. Turning back to FIGS. 1 and 2, in this embodiment, the lever/actuator 32 of the composite material cutting machine (not shown) are received into the spaces between arms 34 of the base 12. A fastener 38, such as a pin or screw, is inserted through the bores 36 of arms 34 and through the bores (not shown) of the lever/actuator 32 to attach the base 12 to the composite material cutting machine. When the fastener 38 is a pin, the pin may be welded or bonded to the base 12 and/or lever/actuator 32. Additionally, the attachment mechanism 30 is shown as a hinged attachment. However, in other embodiments, the attachment mechanism may form a sold, non-hinged attachment. Furthermore, the base 12 also may be attached to the composite material cutting machine in any other suitable manner.

The base 12 also includes a shoulder 22 and a leg 24 at the front end 26 thereof. The free end 25 of the leg 24 may include a chamfer 40 adjacent to an end surface 42. The leg 24 also includes a bore 44 therethrough, which includes a threaded portion 48 that corresponds with threads 49 of the screw 16. In the illustrated embodiment, the bore 44, optionally, may include a recess defined by a shoulder 50 located within the bore 44.

Figure 4:
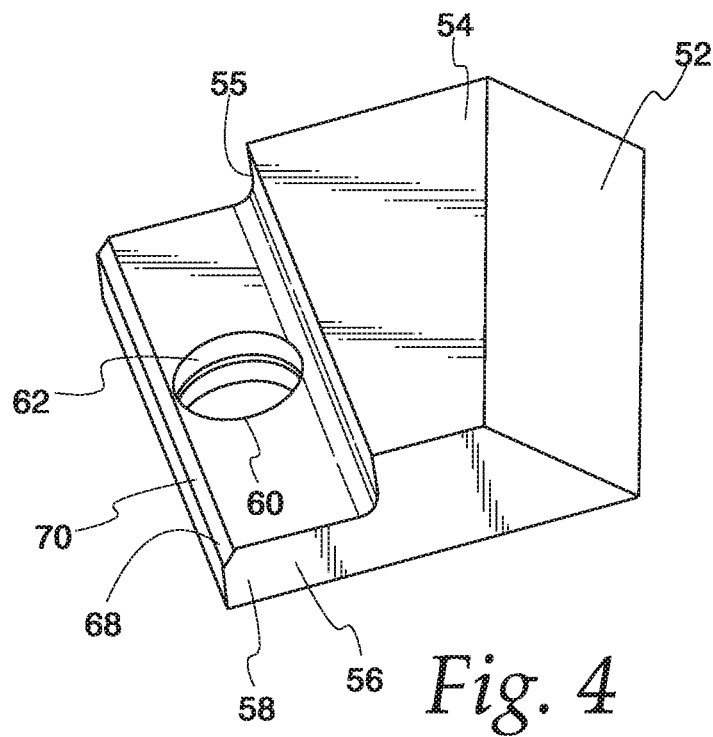
FIG. 4 is a perspective view of the cutting member of the modular cutter assembly shown in FIG. 1.

Turning now to cutting member 14 and FIGS. 1, 2 and 4, cutting member 14 includes a blade 52 at the front end 54 thereof. The cutting member 14 also includes a shoulder 55 and a leg 56 at the back end 58 thereof. The leg 56 includes a bore 60 therethrough that is configured to accept screw 16 therethrough when the cutting member 14 and base 12 are attached together. The bore 60, optionally, may include a counter sink 62. In the illustrated embodiment, the counter 62 that may have a conical profile that corresponds to the conical profile of the head 64 of the screw 16. The leg 56 also includes a chamfer 68 adjacent and end surface 70.

Figure 5:
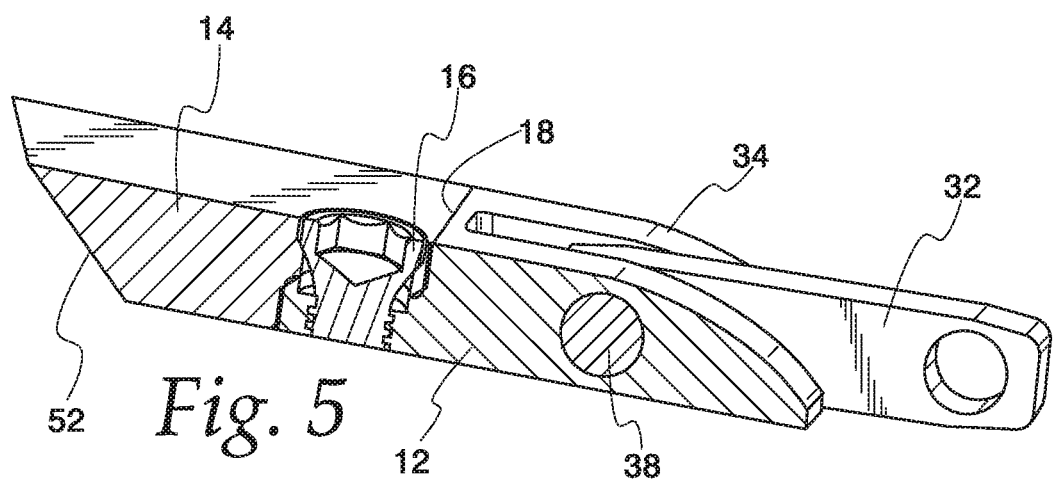
FIG. 5 is a cross-sectional view of the modular cutter assembly shown in FIG. 1.
Figure 5A:
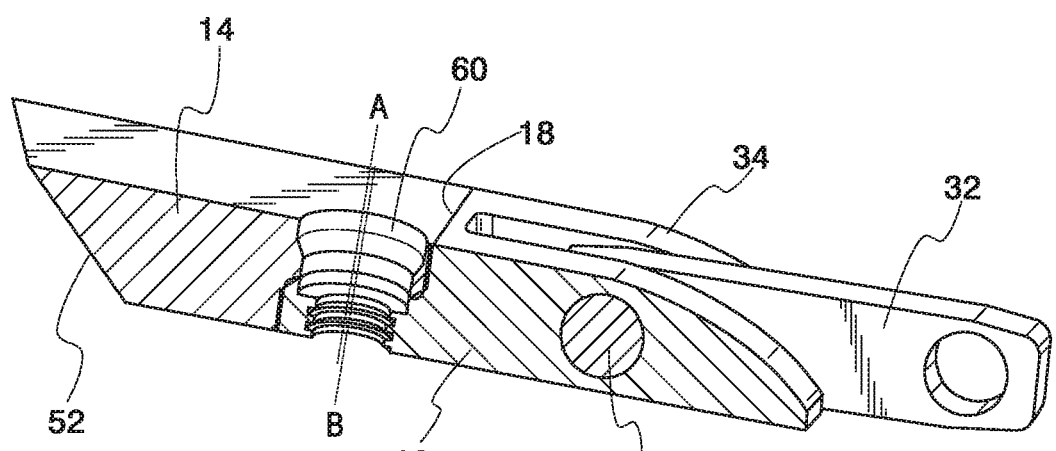
FIG. 5A is a cross-sectional view of the modular cutter assembly shown in FIG. 1.

To removably attach the cutting member 14 to the base 12, the leg 24 of the base 12 and the leg 56 of the cutting member 14 are contacted and aligned with each other in an overlapping manner. In this overlapping manner, the end surface 70 of the cutting member's leg 56 is in contact with the shoulder 22 of the base 12, and the end surface 42 of the base's leg 24 is in contact with the shoulder 55 of the cutting member 14. The bores 44 and 60 are also generally adjacent to each other, but the bores 44 and 60 are slightly misaligned in a direction perpendicular to the shoulders 55 and 22. For example, the central axis B of bore 44 and the central axis A of bore 60 may be misaligned (as shown in FIG. 5A) by, for example, 3 mils.

Figure 6:
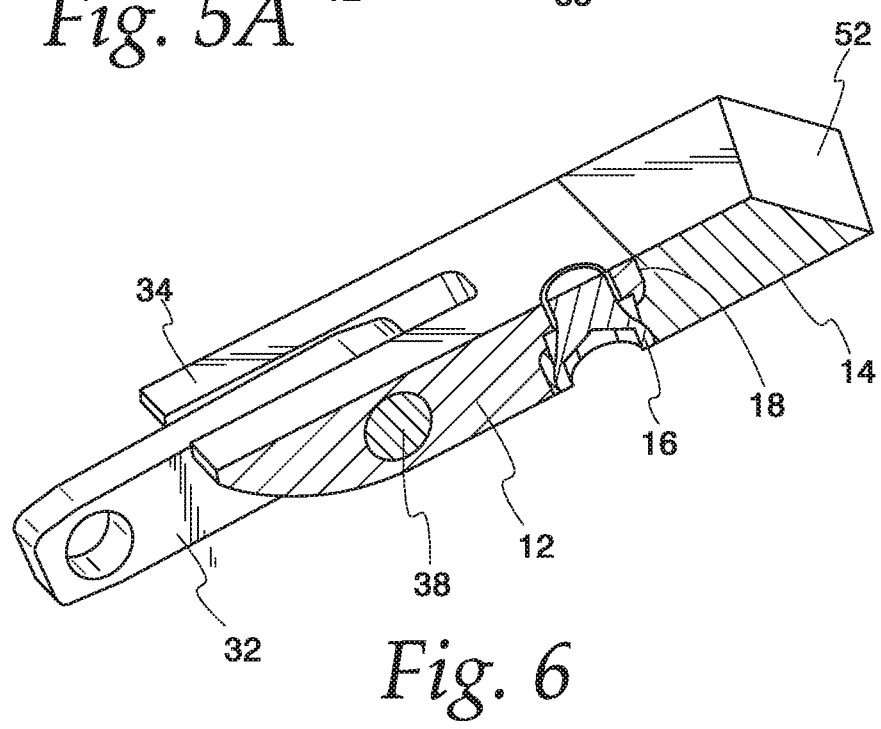
FIG. 6 is a cross-sectional view of the modular cutter assembly shown in FIG. 1.

Once the legs 24 and 56 are aligned, the screw 16 is inserted through bore 60 of the cutting member 14 and into bore 44 of the base 12 wherein the threads 49 of the screw 16 engage the threads 48 of bore 44 in the leg 24 of the base 12. The screw 16 is then rotated, and the engagement between threads 48 and 49 draws the leg 56 of the cutting member 14 and the leg 24 of the base 12 together. As the screw 16 tightens, the interaction between the screw head 64 and the counter sink 62 of the bore 60 of the leg 56 compresses the leg 24 of the base 12 and the leg 56 of the cutting member 14 together in the direction of the central axis of the bores 44 and 60. Also, the interaction between the screw 16 and the misaligned bores 44 and 60 causes the base 12 and the cutting member 14 to move laterally toward each other in a direction perpendicular to the axis of the bores. This results in a compression force from compressing the end surface 70 of the cutting member's leg 56 and the shoulder 22 of the base 12 against each other, and compressing the end surface 42 of the base's leg 24 and the shoulder 55 of the cutting member 14 against each other, as shown in FIGS. 5-7.

Figure 7:
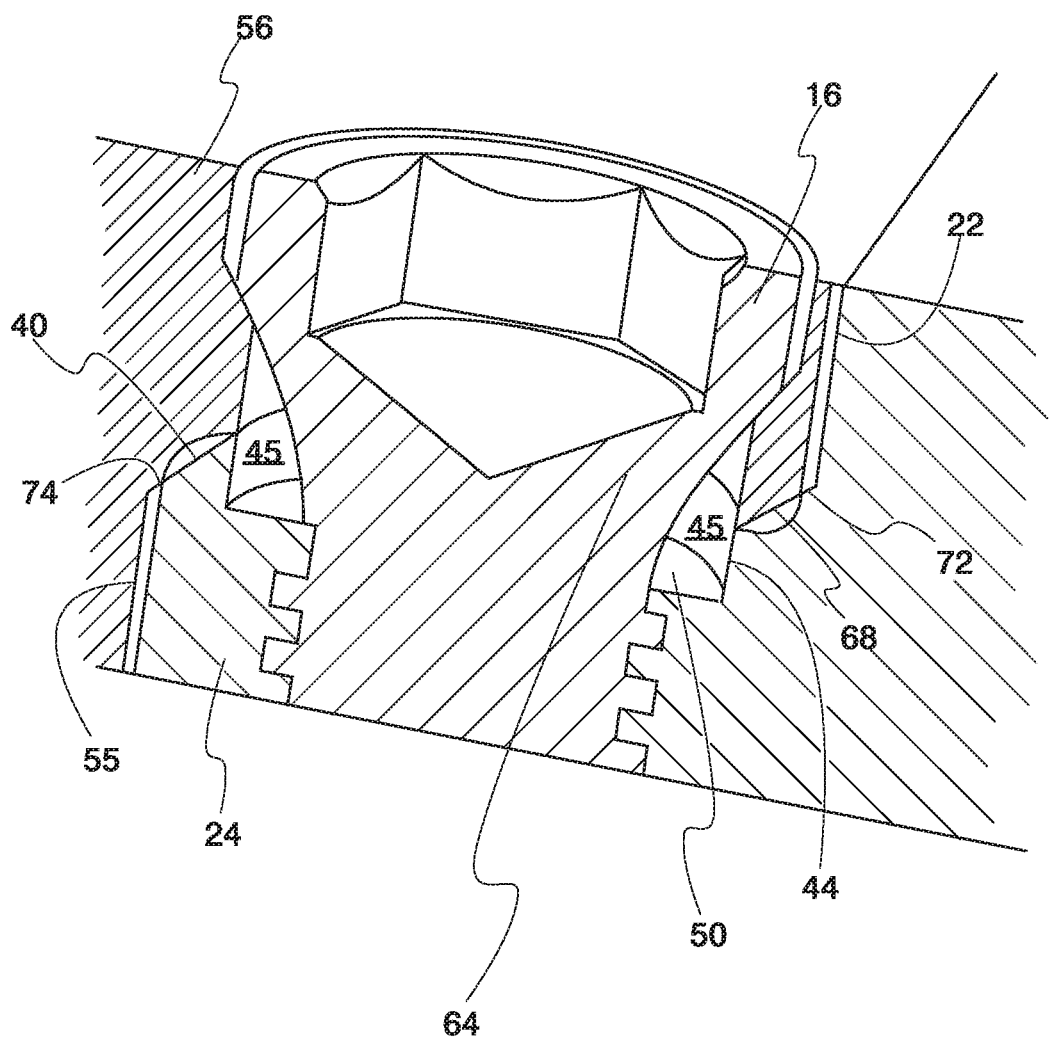
FIG. 7 is an enlarged cross-sectional view of the modular cutter assembly of FIG. 1, showing a portion of the lap joint.

Referring to FIG. 7, there is shown an enlarged view of a portion of the lap joint. In this illustrated embodiment, and optionally, the profiles of the legs 24 and 56 and the shoulders 22 and 55 of the base 12 and cutting member 14, respectively, may assist in aligning the base 12 and cutting member 14 into the final position and also may assist in the mechanical attachment of the same. For example, each of the shoulders 22 and 55 may include a sight protrusion or step 72 and 74, respectively. When the screw 16 is tightened, the chamfer 40 of leg 24 may contact and ride along step 74 in shoulder 55 and chamber 68 of leg 56 may contact and ride along step 72 to assist in aligning the base 12 and cutting 14 into the proper position. Contact between these features may also increase the compressive forces against the shoulders and the end walls. As also seen in FIG. 7, the recess defined by shoulder 50 in bore may provide an open space between the screw head 64 and the internal wall 45 of the bore 44.

It has been surprisingly found that the mechanical attachment between the base 12 and cutting member 14 of the cutter assemblies described herein have sufficient strength and integrity to endure the stresses that the cutter assembly is placed under during repeated cutting of composite material. It was believed that a mechanical attachment could not employed in a cutter assembly for cutting composite material because the stress placed on the cutter assembly would readily cause failure at the point of mechanical attachment. However, in the cutter assemblies in accordance with the present disclosure, the mechanical joint and compressive forces created by such joint allow for the forces generated during cutting of the composite material to be more evenly transmitted across the cutter assembly. It is believe that this even transmission prevents the forces generated during cutting from being concentrated on the joint, which reduces the risk of failure at the joint.

Figure 8:
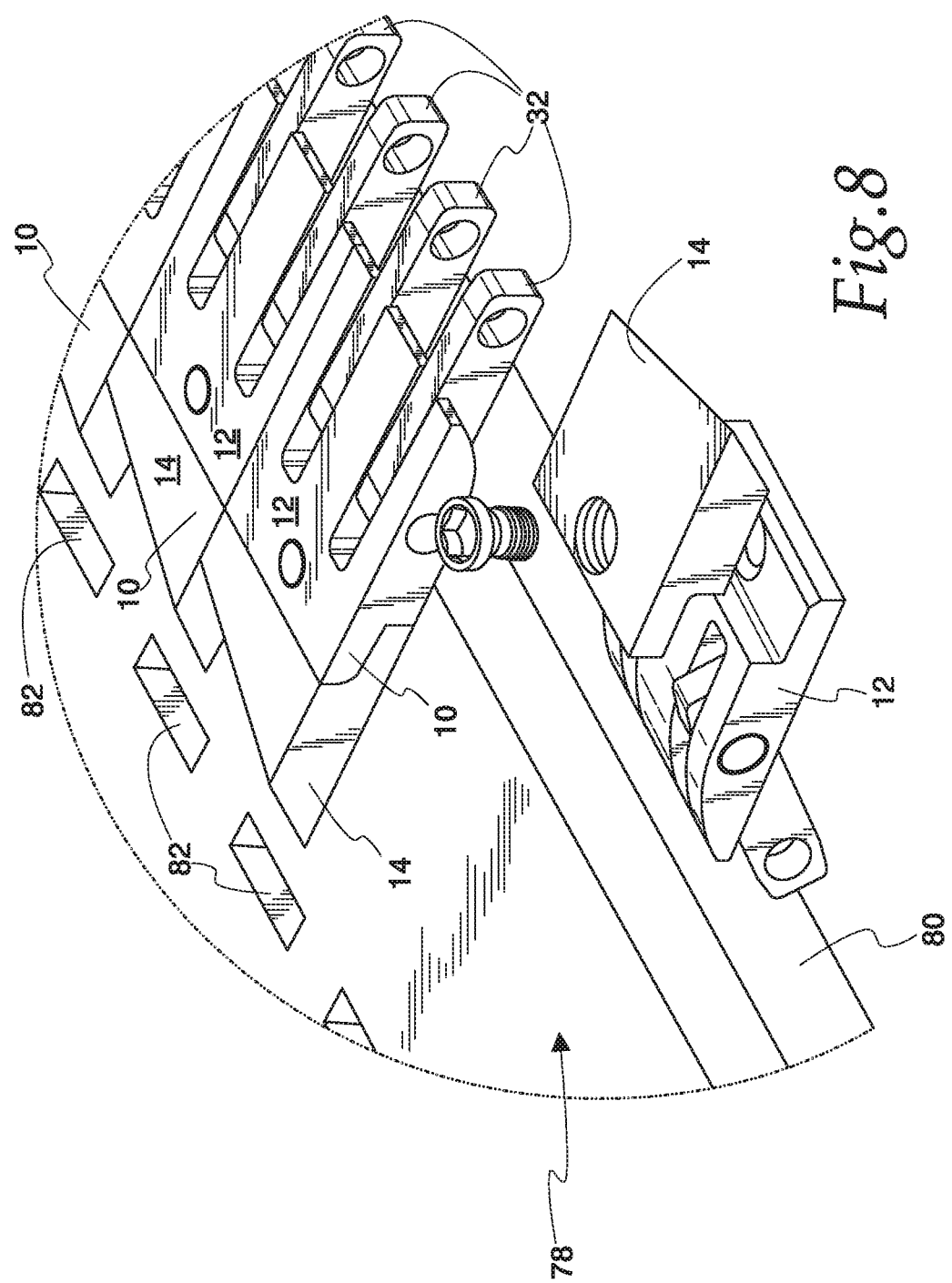
FIG. 8 is a partial perspective view of one embodiment of a cutting machine that includes multiple modular cutting assemblies.

Turning to FIG. 8, in use, one or more of the cutter assemblies 10 may be mounted in a composite placement machine 78 to apply composite material (not shown) onto an application surface. In this embodiment, the composite placement machine 78 includes a frame 80 having one or more openings 82 that the composite material is feed through. Each opening 82 has a modular cutter assembly 10 aligned therewith. Each cutter assembly 10 operates in conjunction with a lever/actuator 32 the drives the cutter assembly 10 in a downward direction past the opening 82 to sever composite material as the material is delivered to the application surface. If a cutting member 14 needs to be changed, the operator detaches the cutting member 14 from the base 12 and attaches a new cutting member, as described above.

Having thus described the device, various modifications and alterations will occur to those skilled in the art, which modifications and alterations will be within the scope of the device as defined by the appended claims.

The invention claimed is:

1. A modular cutter assembly for cutting a composite material, the modular cutter assembly comprising:
   a plurality of cutting modules arranged proximate to one another, each cutting module of the plurality of cutting modules comprising
      a base comprising a first shoulder with a first protrusion and a first leg extending in a first direction from the first shoulder, the first leg including a first free terminal end; and
      a cutting member comprising a second shoulder with a second protrusion and a second leg extending in a second direction that is opposite of the first direction, the second leg including a second free terminal end, the cutting member comprising a material being different than a material of the base,
         the first leg of the base and the second leg of the cutting member being aligned in an overlapping fashion to define a lap joint, wherein the first free terminal end of the first leg of the base contacts the second shoulder of the cutting member and the second free terminal end of the second leg of the cutting member contacts the first shoulder of the base, and the first free terminal end of the first leg of the base and the second free terminal end of the second leg of the cutting member have an end surface including a chamfer,
         the first leg of the base comprising a first bore and the second leg of the cutting member comprising a second bore, and each cutting module of the plurality of cutting modules further comprising a screw to be received within the first bore and the second bore, and when the screw is tightened, the chamfer of the first leg of the base contacts and rides along the second protrusion of the second shoulder of the cutting member, and the chamfer of the second leg of the cutting member contacts and rides along the first protrusion of the first shoulder of the base to assist in aligning the base and the cutting member into a proper position, such that when the screw is received within the first bore and the second bore, the base is secured to the cutting member,
   wherein a central axis of the first bore and a central axis of the second bore are misaligned when the first leg of the base and the second leg of the cutting member are aligned in the overlapping fashion, such that the first free terminal end of the first leg of the base is in contact with the second shoulder of the cutting member and the second free terminal end of the second leg of the cutting member is in contact with the first shoulder of the base, prior to the screw being received within the first bore and the second bore,
   wherein in the plurality of cutting modules, each cutting member is directly in contact with at least one other cutting member, and
   wherein a lever moves the plurality of cutting modules in a linear motion to cut the composite material.

2. The modular cutter assembly of claim 1, wherein one of the first bore and the second bore has a countersink and the screw has a head mating with the countersink as the screw is inserted into the first bore and the second bore, the mating between the head of the screw and the countersink causing the base and the cutting member to move laterally toward each other.

3. The modular cutter assembly of claim 1, wherein an interaction between the screw and the first leg and the second leg creates a compression force that assists in attaching the base to the cutting member.

4. The modular cutter assembly of claim 3, wherein the compression force includes compressing the second free terminal end of the second leg of the cutting member and the first shoulder of the base against each other, and compressing the first free terminal end of the first leg of the base and the second shoulder of the cutting member against each other.

5. The modular cutter assembly of claim 1, wherein the cutting member comprises a carbon or a diamond compound material.

6. A machine for cutting composite materials, comprising:
   a lever; and
   a plurality of cutting modules arranged proximate to one another, each cutting module of the plurality of cutting modules comprising a base attached to the lever, the base comprising a first shoulder with a first protrusion and a first leg extending in a first direction from the first shoulder, the first leg including a first free terminal end and a cutting member comprising a second shoulder with a second protrusion and a second leg extending in a second direction that is opposite of the first direction, the second leg including a second free terminal end, the cutting member comprising a material being different than a material of the base,
      the first leg of the base and the second leg of the cutting member being aligned in an overlapping fashion to define a lap joint, wherein the first free terminal end of the first leg of the base contacts the second shoulder of the cutting member and the second free terminal end of the second leg of the cutting member contacts the first shoulder of the base, and the first free terminal end of the first leg of the base and the second free terminal end of the second leg of the cutting member have an end surface including a chamfer,
      the first leg of the base comprising a first bore and the second leg of the cutting member comprising a second bore, and each cutting module of the plurality of cutting modules further comprising a screw to be received within the first bore and the second bore, and when the screw is tightened, the chamfer of the first leg of the base contacts and rides along the second protrusion of the second shoulder of the cutting member, and the chamfer of the second leg of the cutting member contacts and rides along the first protrusion of the first shoulder of the base to assist in aligning the base and the cutting member into a proper position, such that when the screw is received within the first bore and the second bore, the base is secured to the cutting member,
   wherein a central axis of the first bore and a central axis of the second bore are misaligned when the first leg of the base and the second leg of the cutting member are aligned in the overlapping fashion, such that the first free terminal end of the first leg of the base is in contact with the second shoulder of the cutting member and the second free terminal end of the second leg of the cutting member is in contact with the first shoulder of the base, prior to the screw being received within the first bore and the second bore,
   wherein in the plurality of cutting modules, each cutting member is directly in contact with at least one other cutting member, and
   wherein the lever moves the plurality of cutting modules in a linear motion to cut the composite materials.

7. The machine for cutting composite materials of claim 6, wherein one of the first bore and the second bore has a countersink and the screw has a head mating with the countersink as the screw is inserted into the first bore and the second bore, the mating between the head of the screw and the countersink causing the base and the cutting member to move laterally toward each other.

8. The machine for cutting composite materials of claim 6, wherein an interaction between the screw and the first leg and the second leg creates a compression force that assists in attaching the base to the cutting member.

9. The machine for cutting composite materials of claim 8, wherein the compression force includes compressing the second free terminal end of the second leg of the cutting member and the first shoulder of the base against each other, and compressing the first free terminal end of the first leg of the base and the second shoulder of the cutting member against each other.

10. The machine for cutting composite materials of claim 6, wherein the cutting member comprises a carbon or a diamond compound material.

11. A modular cutter assembly for cutting a composite material, the modular cutter assembly comprising:
  a plurality of cutting modules arranged proximate to one another, each cutting module of the plurality of cutting modules comprising
    a base comprising a first shoulder with a first protrusion and a first leg extending in a first direction from the first shoulder, the first leg including a first free terminal end; and
    a cutting member comprising a second shoulder with a second protrusion and a second leg extending in a second direction that is opposite of the first direction, the second leg including a second free terminal end, the cutting member comprising a material being different than a material of the base,
      the first leg of the base and the second leg of the cutting member being aligned in an overlapping fashion to define a lap joint, wherein the first free terminal end of the first leg of the base contacts the second shoulder of the cutting member and the second free terminal end of the second leg of the cutting member contacts the first shoulder of the base, and the first free terminal end of the first leg of the base and the second free terminal end of the second leg of the cutting member have an end surface including a chamfer,
    the first leg of the base comprising a first bore and the second leg of the cutting member comprising a second bore, and each cutting module of the plurality of cutting modules further comprising a screw to be received within the first bore and the second bore, and when the screw is tightened, the chamfer of the first leg of the base contacts and rides along the second protrusion of the second shoulder of the cutting member, and the chamfer of the second leg of the cutting member contacts and rides along the first protrusion of the first shoulder of the base to assist in aligning the base and the cutting member into a proper position, such that when the screw is received within the first bore and the second bore, the base is secured to the cutting member,
  wherein a central axis of the first bore and a central axis of the second bore are misaligned when the first leg of the base and the second leg of the cutting member are aligned in the overlapping fashion, such that the first free terminal end of the first leg of the base is in contact with the second shoulder of the cutting member and the second free terminal end of the second leg of the cutting member is in contact with the first shoulder of the base, prior to the screw being received within the first bore and the second bore, and
  wherein a lever moves the plurality of cutting modules in a linear motion to cut the composite material.

12. The modular cutter assembly of claim 11, wherein in the plurality of cutting modules, each cutting member is directly in contact with at least one other cutting member.

\* \* \* \* \*